United States Patent [19]
Kozuka et al.

[11] Patent Number: 5,499,309
[45] Date of Patent: Mar. 12, 1996

[54] METHOD OF FABRICATING OPTICAL COMPONENT INCLUDING FIRST AND SECOND OPTICAL WAVEGUIDE CHIPS HAVING OPPOSED INCLINED SURFACES

[75] Inventors: Yoshinari Kozuka; Yukihisa Osugi; Masashi Fukuyama, all of Nagoya, Japan

[73] Assignee: NGK Insulators, Ltd., Japan

[21] Appl. No.: 314,302

[22] Filed: Sep. 30, 1994

[30] Foreign Application Priority Data

Oct. 1, 1993 [JP] Japan .................................. 5-247233

[51] Int. Cl.$^6$ ........................................ G02B 6/26
[52] U.S. Cl. ............................... 385/38; 385/47; 385/48; 385/65
[58] Field of Search ..................... 385/15–18, 31, 385/38, 39, 44, 45, 47–52, 65, 83, 147

[56] References Cited

U.S. PATENT DOCUMENTS

| | | | |
|---|---|---|---|
| 3,970,360 | 7/1976 | Kersten et al. | 385/39 |
| 4,165,496 | 8/1979 | Domenico, Jr. et al. | 372/31 |
| 4,285,571 | 8/1981 | Winzer | 385/47 X |
| 4,373,775 | 2/1983 | Gasparian | 385/47 |
| 4,900,118 | 2/1990 | Yanagawa et al. | 385/49 X |
| 5,390,266 | 2/1995 | Heitmann et al. | 385/44 |

FOREIGN PATENT DOCUMENTS

| | | |
|---|---|---|
| 0292331 | 11/1988 | European Pat. Off. . |
| 0509789 | 10/1992 | European Pat. Off. . |
| 2549243 | 1/1985 | France . |
| 63-289509 | 11/1988 | Japan .................................. 385/47 |
| 1-118806 | 5/1989 | Japan . |

OTHER PUBLICATIONS

"Optical Fiber Coupling Approaches for Multi-Channel Laser and Detector Arrays," K. P. Jackson et al., *SPIE*, vol. 994, Optoelectronic Materials, Devices, Packaging, and Interconnects II (1988), pp. 40–47 (no month).

*Primary Examiner*—John D. Lee
*Attorney, Agent, or Firm*—Parkhurst Wendel & Rossi

[57] ABSTRACT

A V groove and guide grooves are defined in a ceramic substrate, and an optical fiber is fixedly disposed in the V groove by the ceramic substrate and a cover, thereby producing a first optical waveguide chip. A V groove and guide grooves are also defined in another ceramic substrate, and an optical fiber is fixedly disposed in the V groove by the ceramic substrate and a cover, thereby producing a second optical waveguide chip. The first optical waveguide chip has an end face inclined to the direction of propagation of light through the optical fiber thereof, and the second optical waveguide chip also has an end face inclined to the direction of propagation of light through the optical fiber thereof. The first and second optical waveguide chips are positioned relatively to each other by guide pins intimately placed in the guide grooves, and the inclined end faces extend substantially parallel to each other with an air layer interposed therebetween. An optical component such as an optical transmission/reception module thus produced can easily be reduced in size and cost, and fabricated in an integrated configuration.

29 Claims, 9 Drawing Sheets

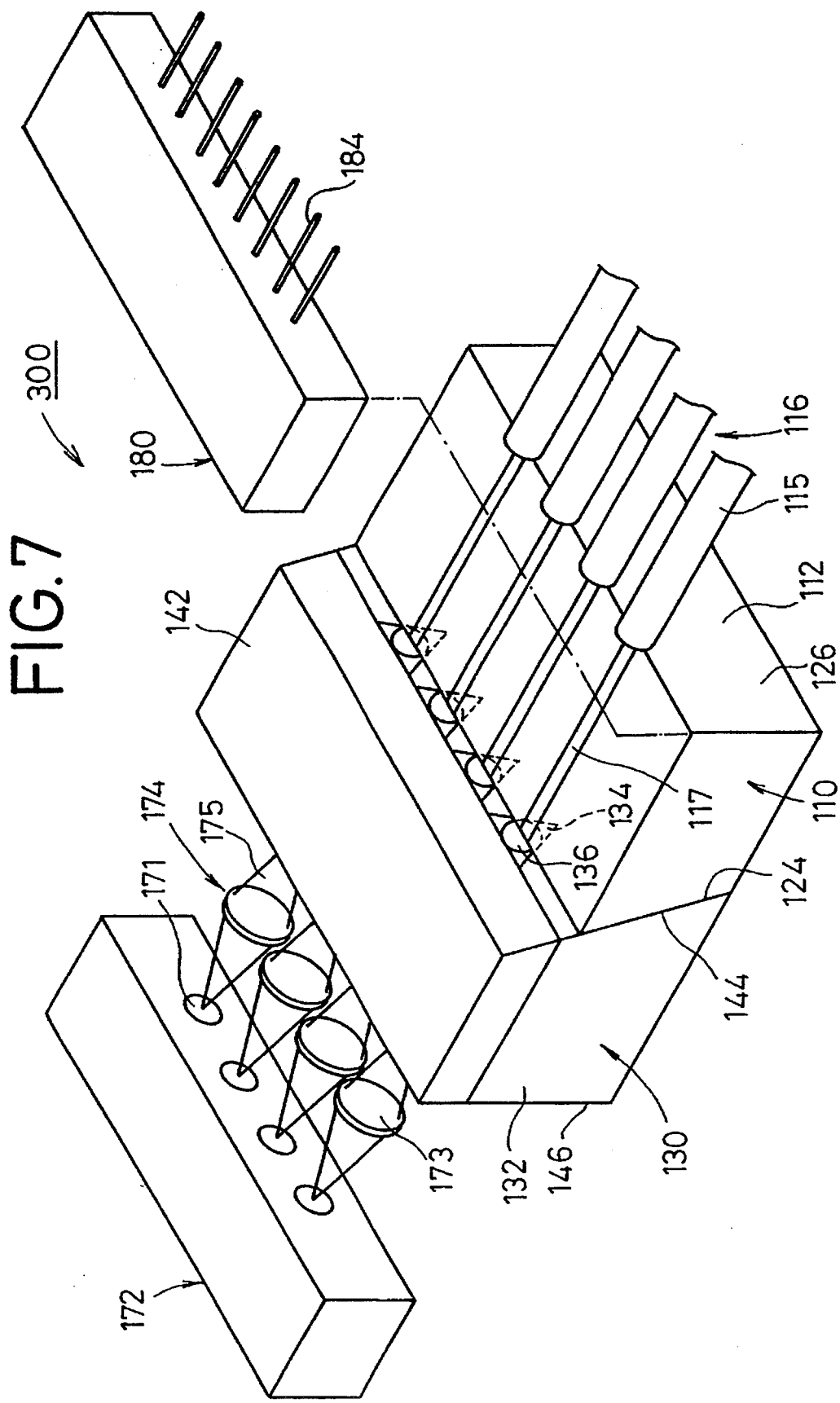

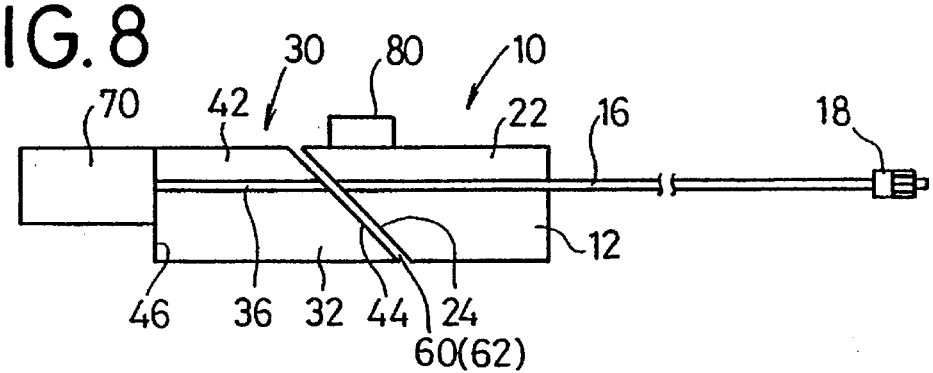
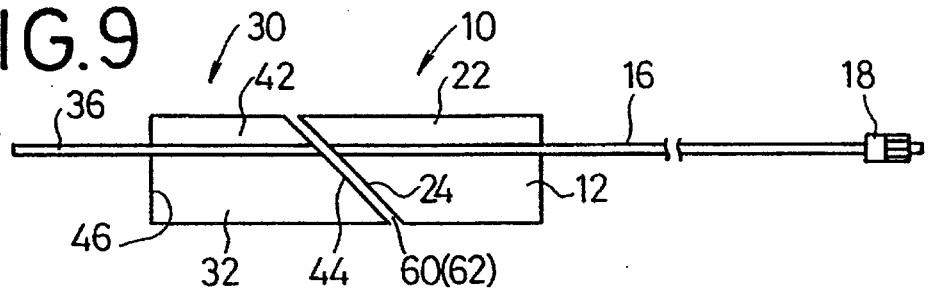
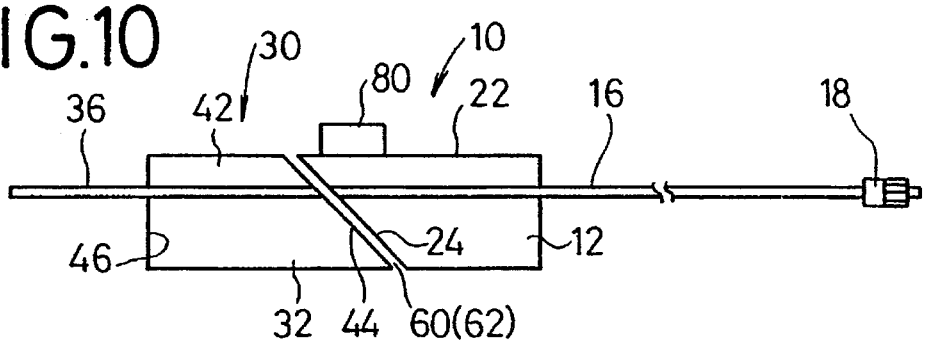
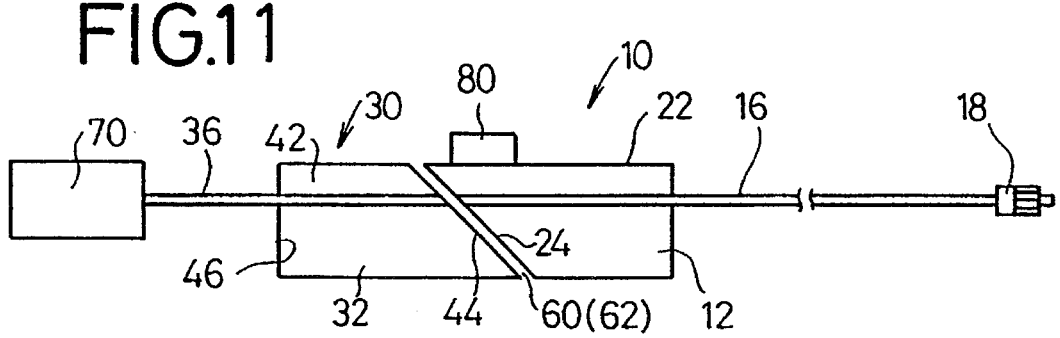

METHOD OF FABRICATING OPTICAL COMPONENT INCLUDING FIRST AND SECOND OPTICAL WAVEGUIDE CHIPS HAVING OPPOSED INCLINED SURFACES

BACKGROUND OF THE INVENTION

1. Field of the Invention

The present invention relates to a method of fabricating an optical component, and more particularly to a method of fabricating an optical transmission/reception module for use in optical CATV and optical communication fields.

2. Description of the Related Art

As the optical fiber transmission technology advances, various research activities are directed to optical CATV and optical communication systems which utilize the wide-band characteristics of the optical fibers. It is expected that there will be realized a Fiber-To-The-Home (FTTH) system which has optical fibers led to homes for starting various information services in the near future. For realizing a full-fledged FTTH system, it is necessary to reduce the size and cost of optical terminals connected to respective homes.

The FTTH system requires a bidirectional optical transmission mode which needs to be performed by an optical reception/transmission module comprising a light source for emitting an optical signal, a light-detecting element for converting the optical signal into an electric signal, and an optical coupler for transmitting light from the optical source and light to the light-detecting element to optical fibers that are used to transmit light.

FIG. 1 of the accompanying drawings schematically shows a conventional optical reception/transmission module A. As shown in FIG. 1, the optical reception/transmission module A comprises a laser diode 1, a photodiode 2, and an optical coupler 3. The optical coupler 3 comprises two optical fibers 4, 5 fused together. Therefore, it is difficult to reduce the length of the optical coupler 3. The optical coupler 3 and the laser diode 1, and the optical coupler 3 and the photodiode 2 are connected to each other by optical fibers through fused regions 6 thereof. Consequently, the optical reception/transmission module A is relatively long in its entirety. If a plurality of optical reception/transmission modules A are required, then since the individual optical reception/transmission modules A have to be arrayed horizontally or vertically, the space taken up by the optical reception/transmission modules A increases and the cost of the entire system also increases as the number of optical reception/transmission modules A increases.

As described above, inasmuch as the optical coupler 3 is composed of the two optical fibers 4, 5 fused together and the optical reception/transmission module A is made up of three components, i.e., the laser diode 1, the photodiode 2, and the optical coupler 3, the conventional optical reception/transmission module A has been problematic with respect to both the space occupied thereby and the cost thereof. In the case where the optical reception/transmission module A is incorporated in an on-demand access system of CATV, it is necessary to use many optical couplers 3 and optical reception/transmission modules A in a transmission terminal. Therefore, such an on-demand access system with the conventional optical couplers 3 and optical reception/transmission modules A takes up a large space and is expensive.

SUMMARY OF THE INVENTION

It is an object of the present invention to provide a method of fabricating an optical component such as an optical coupler or an optical reception/transmission module in a manner to reduce the size thereof.

Another object of the present invention is to provide a method of fabricating an optical component such as an optical coupler or an optical reception/transmission module easily in an integrated configuration, so that the optical component can be reduced in size and cost.

According to the present invention, there is provided a method of fabricating an optical component, comprising the steps of:

forming a first optical waveguide chip having a first optical waveguide;

forming a second optical waveguide chip having a second optical waveguide and different from said first optical waveguide chip;

processing said first optical waveguide chip to form a first end face thereof at which an end of said first optical waveguide is exposed;

polishing said first optical waveguide chip to an optical finish to incline a second end face thereof at which an opposite end of said first optical waveguide is exposed, to a direction in which light is propagated through said first optical waveguide;

processing said second optical waveguide chip to form a third end face thereof at which an end of said second optical waveguide is exposed;

polishing said second optical waveguide chip to an optical finish to incline a fourth end face thereof at which an opposite end of said second optical waveguide is exposed, to a direction in which light is propagated through said second optical waveguide; and positioning said first optical waveguide chip and said second optical waveguide chip relatively to each other such that said second and fourth end faces extend substantially parallel to each other with a layer interposed therebetween which has a refractive index that is different from the refractive index of at least one of said first and second optical waveguides, said first and second optical waveguides are optically coupled to each other, and a portion of light propagated from said first optical waveguide to said second optical waveguide is reflected out of at least one of the first and second optical waveguide chips by at least one of said second end face of said first optical waveguide chip and said fourth end face of said second optical waveguide chip.

According to the above method, the first optical waveguide chip having the first optical waveguide is formed and polished to an optical finish such that the second end face of the first optical waveguide chip where the end of the first optical waveguide is exposed is inclined to the direction of propagation of light through the first optical waveguide, and the second optical waveguide chip having the second optical waveguide and different from the first optical waveguide chip is formed and polished to an optical finish such that the fourth end face of the second optical waveguide chip where the end of the second optical waveguide is exposed is inclined to the direction of propagation of light through the second optical waveguide. The first and second optical waveguides are positioned relatively to each other such that the second and fourth end faces extend substantially parallel to each other with a layer interposed therebetween which has a refractive index that is different from the refractive index of at least one of the first and second optical waveguides. A portion of light propagated from the first optical waveguide to the second optical waveguide is reflected out of at least one of the first and second optical waveguide chips by at least one of the second and fourth end faces of the first and second optical waveguide chips.

According to the present invention, there is also provided a method of fabricating an optical component, comprising the steps of:

forming a first optical waveguide chip having a first optical waveguide;

forming a second optical waveguide chip having a second optical waveguide which has a refractive index different from the refractive index of said first optical waveguide, and different from said first optical waveguide chip;

processing said first optical waveguide chip to form a first end face thereof at which an end of said first optical waveguide is exposed;

polishing said first optical waveguide chip to an optical finish to incline a second end face thereof at which an opposite end of said first optical waveguide is exposed, to a direction in which light is propagated through said first optical waveguide;

processing said second optical waveguide chip to form a third end face thereof at which an end of said second optical waveguide is exposed;

polishing said second optical waveguide chip to an optical finish to incline a fourth end face thereof at which an opposite end of said second optical waveguide is exposed, to a direction in which light is propagated through said second optical waveguide; and positioning said first optical waveguide chip and said second optical waveguide chip relatively to each other such that said second and fourth end faces extend substantially parallel to each other, the ends of said first and second optical waveguides which are exposed at said second and fourth end faces are held in direct contact with each other and optically coupled to each other, and a portion of light propagated from said first optical waveguide to said second optical waveguide is reflected out of at least one of the first and second optical waveguide chips by at least one of said second end face of said first optical waveguide chip and said fourth end face of said second optical waveguide chip.

According to the above method, the first optical waveguide chip having the first optical waveguide is formed and polished to an optical finish such that the second end face of the first optical waveguide where the end of the first optical waveguide chip is exposed is inclined to the direction of propagation of light through the first optical waveguide, and the second optical waveguide chip having the second optical waveguide whose refractive index differs from that of the first optical waveguide and different from the first optical waveguide chip is formed and polished to an optical finish such that the fourth end face of the second optical waveguide chip where the end of the second optical waveguide is exposed is inclined to the direction of propagation of light through the second optical waveguide. The first and second optical waveguides are positioned relatively to each other such that the second and fourth end faces extend substantially parallel to each other and the exposed ends of the first and second optical waveguides are held in direct contact with each other and optically coupled to each other. A portion of light propagated from the first optical waveguide to the second optical waveguide is reflected out of at least one of the first and second optical waveguide chips by at least one of the second and fourth end faces of the first and second optical waveguide chips.

Therefore, since a portion of light propagated from the first optical waveguide to the second optical waveguide is reflected out of at least one of the first and second optical waveguide chips by at least one of the second and fourth end faces of the first and second optical waveguide chips, the optical component has a length smaller than a conventional optical component which is composed of two optical fibers fused to each other.

The first optical waveguide is disposed in the first optical waveguide chip, and the second optical waveguide chip is disposed in the second optical waveguide chip, and the first and second optical waveguides are optically coupled to each other and light is emitted from the first optical waveguide chip and/or the second optical waveguide chip by the inclined end faces of the first and second optical waveguide chips. If a plurality of light paths are required, then a plurality of first optical waveguides may be disposed in the first optical waveguide chip, and a plurality of second optical waveguides may be disposed in the second optical waveguide chip. As a result, the optical component may easily be fabricated in an integrated configuration, and reduced in size and cost.

In the case where the second optical waveguide whose refractive index differs from that of the first optical waveguide is disposed in the second optical waveguide chip, even though the first and second optical waveguides are positioned relatively to each other such that the exposed ends of the first and second optical waveguides are held in direct contact with each other and optically coupled to each other, a portion of light propagated from the first optical waveguide to the second optical waveguide is reflected out of at least one of the first and second optical waveguide chips. Consequently, the first and second optical waveguide chips can easily be positioned relatively to each other.

At least one or both of the step of forming the first optical waveguide chip having the first optical waveguide and the step of forming the second optical waveguide chip having the second optical waveguide may comprise the steps of placing an optical fiber in a V groove of a V-shaped cross section or a U groove of a U-shaped cross section which is defined in the substrate and fixing the optical fiber in the V or U groove with the substrate and the cover. With such a process, the first optical waveguide and/or the second optical waveguide becomes an optical fiber. Since this optical fiber is of the same material as the optical fiber used for transmission, these optical fibers can easily be spliced to each other with a small optical loss.

If the first optical waveguide and/or the second optical waveguide is formed by a process including the steps of placing an optical fiber in a V groove of a V-shaped cross section or a U groove of a U-shaped cross section which is defined in the substrate and fixing the optical fiber in the V or U groove with the substrate and the cover, then the optical fiber is positioned accurately in the optical waveguide chip. Even though the first optical waveguide and/or the second optical waveguide is an optical fiber, since the cover is disposed over the optical fiber, a light-detecting element for detecting light emitted out of the first optical waveguide and/or the second optical waveguide may be disposed on the cover. Therefore, the light-detecting element may be installed with ease.

At least one or both of the step of forming the first optical waveguide chip having the first optical waveguide and the step of forming the second optical waveguide chip having the second optical waveguide may comprise the step of diffusing an impurity in a dielectric substrate to form an optical waveguide in the dielectric substrate. With such a process, a number of optical waveguides may easily be formed in a substrate, and may easily be fabricated in an integrated configuration. Where the first optical waveguide and/or the second optical waveguide is in the form of an optical waveguide formed by diffusing an impurity in the dielectric substrate, a light-detecting element or the like may easily be placed on the dielectric substrate even without placing a cover on the dielectric substrate.

Preferably, said step of diffusing an impurity in a dielectric substrate to form the optical waveguide in said dielectric substrate comprises the step of diffusing an impurity into a dielectric substrate made of $LiNbO_3$, $LiTaO_3$, glass, or a semiconductor to form the optical waveguide in said dielectric substrate.

In the case where the second and fourth end faces extend substantially parallel to each other with a layer interposed therebetween which has a refractive index that is different from the refractive index of at least one of said first and second optical waveguides, the second and fourth end faces preferably extend substantially parallel to each other with a layer of air, a dielectric, or metal interposed therebetween.

If the layer interposed between the second and fourth end faces is an air layer, the layer should preferably have a thickness in the range of from 0.5 to 10 μm. If the thickness of the layer were smaller than 0.5 μm, then a portion of light propagated from said first optical waveguide to said second optical waveguide would not be practically sufficiently reflected by at least one of said second end face of said first optical waveguide chip and said fourth end face of said second optical waveguide chip. If the thickness of the layer were greater than 10 μm, then the intensity of light propagated from said first optical waveguide to said second optical waveguide would be too low.

In the case where the second and fourth end faces extend substantially parallel to each other with a layer interposed therebetween which has a refractive index that is different from the refractive index of at least one of said first and second optical waveguides, the second and fourth end faces preferably extend substantially parallel to each other with a layer of a dielectric or metal interposed therebetween. With the layer of a dielectric or metal being interposed between the second and fourth end faces, the ends of the first and second optical waveguides which are exposed at said second and fourth end faces are held in direct contact with opposite surfaces, respectively, of said layer.

Consequently, the distance between the exposed ends of the first and second optical waveguides is determined highly accurately, and hence it is possible to determine with accuracy an intensity of light which is transmitted from the first optical waveguide to the second optical waveguide and an intensity of light which is emitted out of at least one of the first and second optical waveguide chips.

Since the dielectric or metal layer is interposed between the exposed ends of the first and second optical waveguides, the intensity of light which is transmitted from the first optical waveguide to the second optical waveguide and the intensity of light which is emitted out of at least one of the first and second optical waveguide chips can easily be controlled by selecting a material of the dielectric or metal layer.

One of the step of forming a first optical waveguide chip having a first optical waveguide and the step of forming a second optical waveguide chip having a second optical waveguide may comprise the steps of placing an optical fiber in a V groove of a V-shaped cross section or a U groove of a U-shaped cross section which is defined in a substrate and fixing the optical fiber in the V or U groove with the substrate and a cover, and the other may comprise the step of diffusing an impurity in a dielectric substrate to form the optical waveguide in said dielectric substrate.

The step of positioning said first optical waveguide chip and said second optical waveguide chip relatively to each other may comprise the steps of defining first and second guide grooves in said first and second optical waveguide chips and positioning said first and second optical waveguide chips with reference to pins intimately held in said first and second guide grooves. Using the first and second guide grooves and the guide pins, it is possible to position the first and second optical waveguides easily with respect to each other.

Both of the step of forming a first optical wave-guide chip having a first optical waveguide and the step of forming a second optical waveguide chip having a second optical waveguide may comprise the steps of placing an optical fiber in a V groove of a V-shaped cross section or a U groove of a U-shaped cross section which is defined in a substrate and fixing the optical fiber in the V or U groove with the substrate and a cover, and the step of positioning said first optical waveguide chip and said second optical waveguide chip relatively to each other may comprise the steps of defining first and second guide grooves in said first and second optical waveguide chips and positioning said first and second optical waveguide chips with reference to pins intimately held in said first and second guide grooves.

The method according to the present invention may further comprise the step of providing a light-detecting element for detecting the light which is reflected out of at least one of the first and second optical waveguide chips by at least one of said second end face and said fourth end face.

If the light-detecting element is employed, at least one of the step of forming a first optical waveguide chip having a first optical waveguide and the step of forming a second optical waveguide chip having a second optical waveguide should preferably comprise the steps of placing an optical fiber in a V groove of a V-shaped cross section or a U groove of a U-shaped cross section which is defined in a substrate and fixing the optical fiber in the V or U groove with the substrate and a cover made of a material which passes light propagated through said optical fiber, and the light-detecting element is fixed to the cover.

The method according to the present invention may further comprise the step of providing a light source for introducing light into said second optical waveguide.

The method according to the present invention may further comprise the step of providing an optical coupling means for optically coupling the light from said light source to the end of said second optical waveguide which is exposed at said third end face.

The step of forming a first optical waveguide chip having a first optical waveguide may comprise the step of forming a first optical waveguide having a plurality of parallel optical waveguides, and said step of forming a second optical waveguide chip having a second optical waveguide may comprise the step of forming a second optical waveguide having a plurality of parallel optical waveguides. With these steps, a highly integrated optical component may be produced.

The angle formed between the second end face of the first optical waveguide and the direction of propagation of light through the first optical waveguide, and the angle formed between the fourth end face of the second optical waveguide and the direction of propagation of light through the second optical waveguide should preferably be 80° or less. If these angles were greater than 80°, then the angle of reflection would be too small, and the distance between the reflecting surfaces and the light-detecting element would be too large, resulting in a widely spread light beam and a reduced intensity of detected light.

The angle formed between the second end face of the first optical waveguide and the direction of propagation of light through the first optical waveguide, and the angle formed between the fourth end face of the second optical waveguide and the direction of propagation of light through the second optical waveguide should more preferably be the Brewster's angle or less. The angle of incidence ranging between the Brewster's angle and the critical angle allows the reflectivity to be large.

However, the angle formed between the second end face of the first optical waveguide and the direction of propagation of light through the first optical waveguide, and the angle formed between the fourth end face of the second optical waveguide and the direction of propagation of light through the second optical waveguide should be (90°— critical angle) or more.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a perspective view illustrating a method of fabricating an optical component according to a third embodiment of the present invention;

FIG. 8 is a cross-sectional view illustrating the methods of fabricating an optical component according to the first and second embodiments of the present invention;

FIG. 9 is a cross-sectional view illustrating a method of fabricating an optical component according to a fourth embodiment of the present invention;

FIG. 10 is a cross-sectional view illustrating a method of fabricating an optical component according to a fifth embodiment of the present invention;

FIG. 11 is a cross-sectional view illustrating a method of fabricating an optical component according to a sixth embodiment of the present invention;

DETAILED DESCRIPTION OF THE PREFERRED EMBODIMENTS

Figure 4:
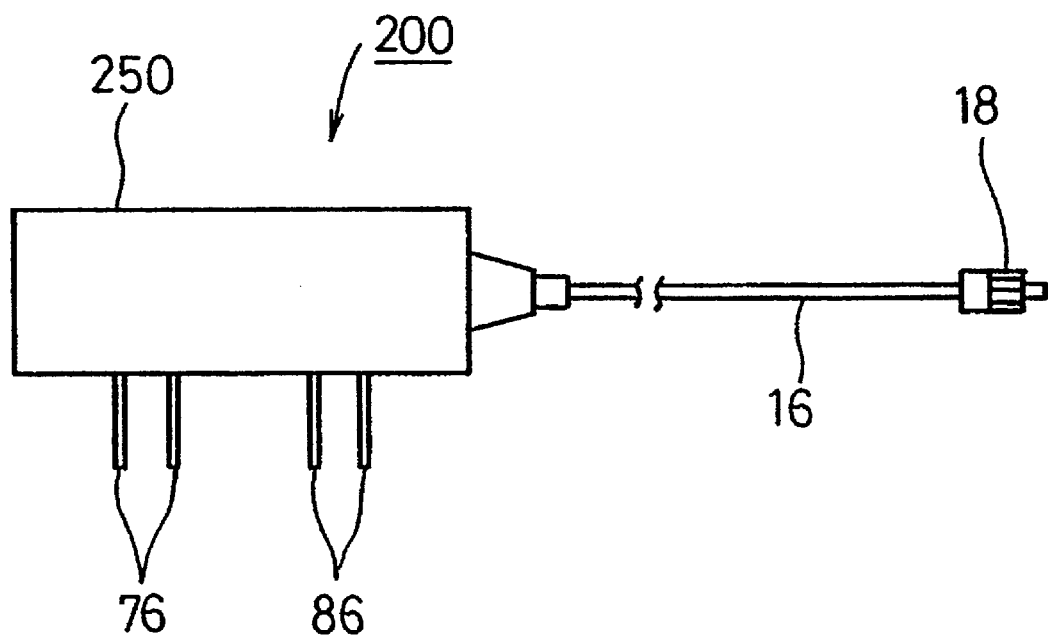
FIG. 4 is a side elevational view illustrating the method of fabricating an optical component according to the first embodiment of the present invention.

As shown in FIG. 4, an optical reception/transmission module 200 fabricated according to the present invention has a package 250 with a single-mode optical fiber 16 extending from one end thereof. An optical connector 18 such as an FC connector is connected to a distal end of the optical fiber 16 remote from the package 250.

Figure 3:
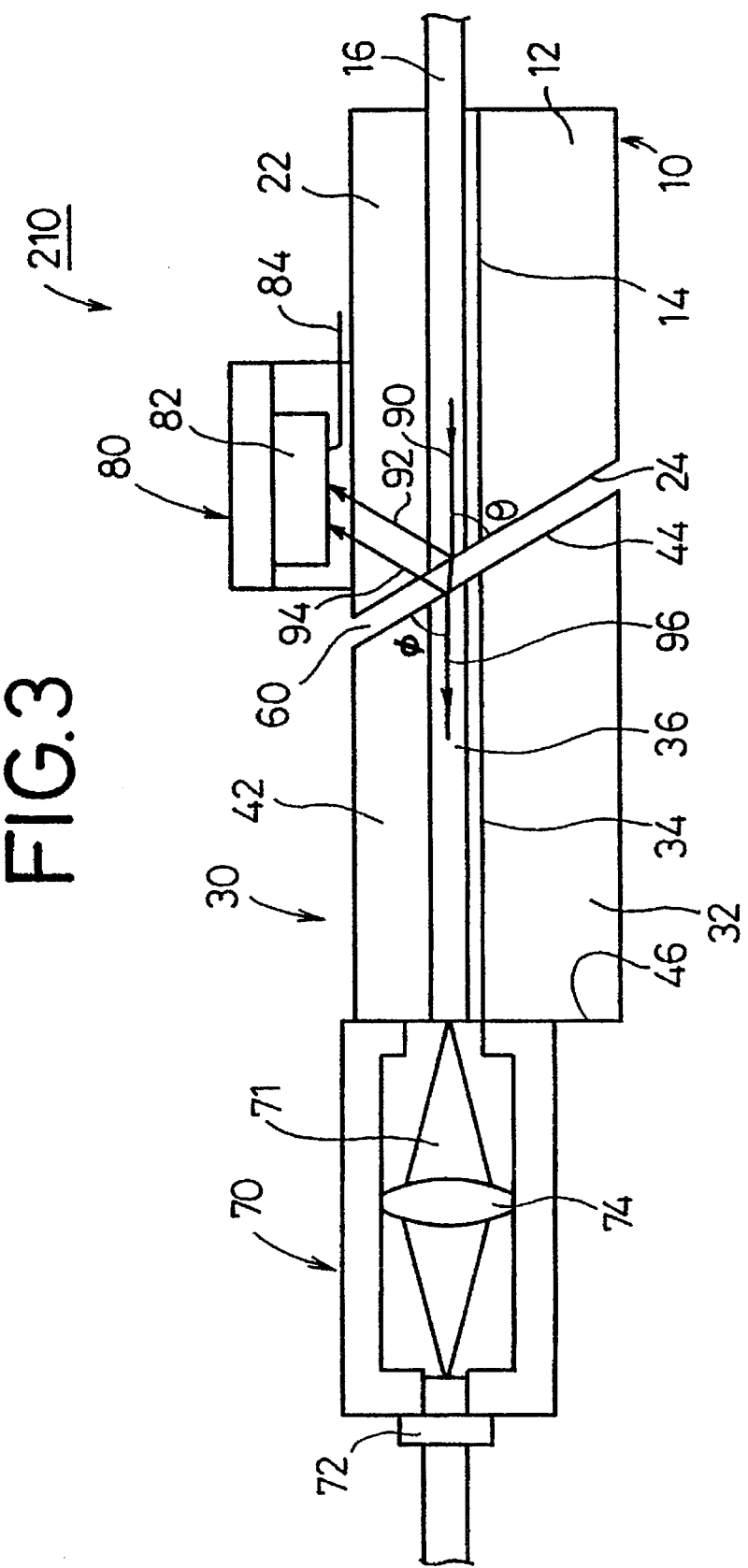
FIG. 3 is a cross-sectional view illustrating the method of fabricating an optical component according to the first embodiment of the present invention.

As shown in FIG. 3, the package 250 houses a component assembly 210 therein. The component assembly 210 comprises a first optical waveguide chip 10, a second optical waveguide chip 30, a photodiode module 80 mounted on the first optical waveguide chip 10, and a laser diode module 70 mounted on an end face 46 of the second optical waveguide chip 30.

The photodiode module 80 has a photodiode 82 disposed therein. The laser diode module 70 includes a laser diode 72 and a lens 74 for converging a laser beam 71 emitted from the laser diode 72 onto an optical fiber 36.

Figure 1:
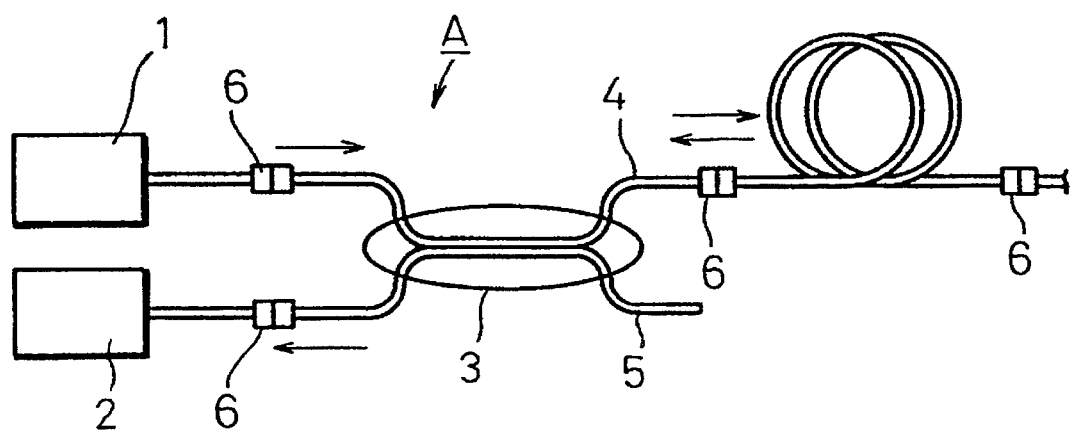
FIG. 1 is a schematic view of a conventional optical reception/transmission module.
Figure 2:
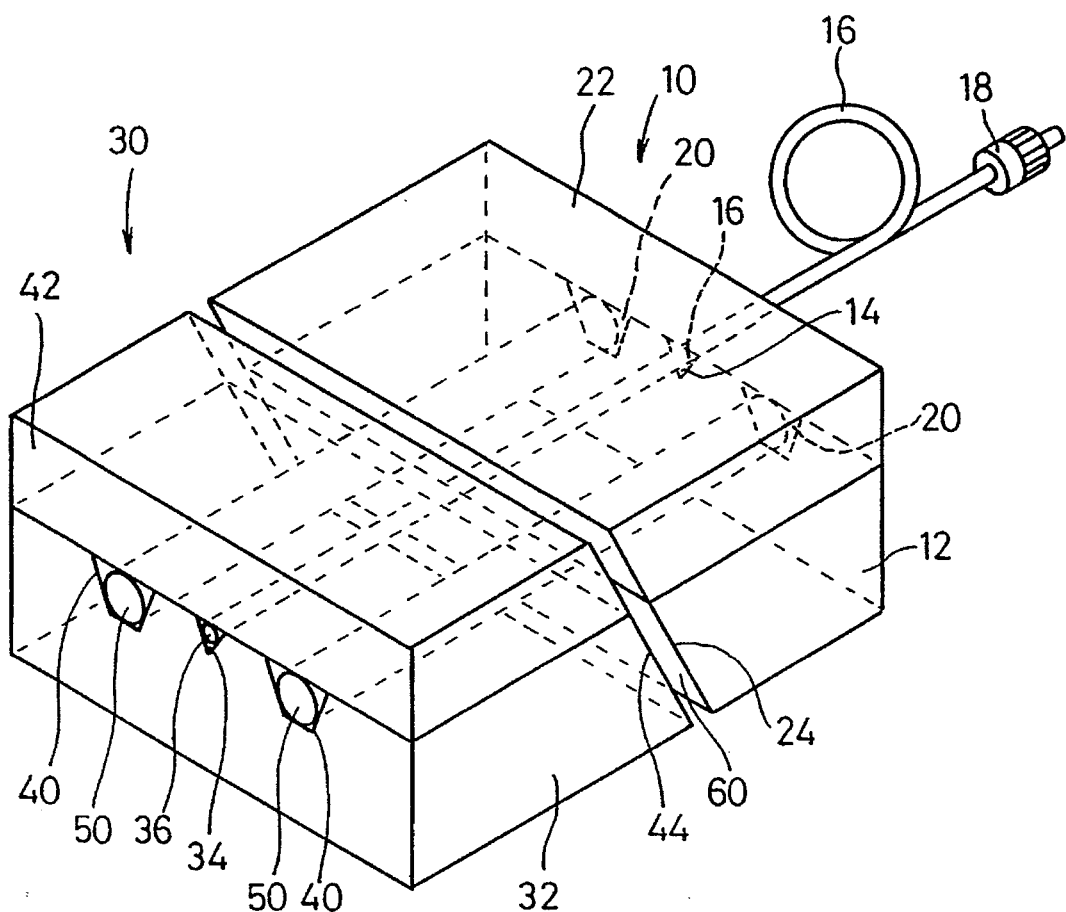
FIG. 2 is a perspective view illustrating a method of fabricating an optical component according to a first embodiment of the present invention.

As shown in FIGS. 2 and 3, the first optical waveguide chip 10 comprises a ceramic substrate 12 and a cover 22 of quartz. The ceramic substrate 12 has a V groove 14 having a V-shaped cross section for placing the optical fiber 16 therein and a pair of guide grooves 20, the V groove 14 and the guide grooves 20 being defined in an upper surface of the ceramic substrate 12. The optical fiber 16 has an end portion fixedly disposed in the V groove 14 by the ceramic substrate 12 and the cover 22. The optical connector 18 is joined to the opposite distal end of the optical fiber 16. The photodiode module 80 is fixedly mounted on an upper surface of the cover 22.

The second optical waveguide chip 30 comprises a ceramic substrate 32 and a cover 42. The ceramic substrate 32 has a V groove 34 having a V-shaped cross section for placing a single-mode optical fiber 36 therein and a pair of guide grooves 40, the V groove 34 and the guide grooves 40 being defined in an upper surface of the ceramic substrate 32. The optical fiber 36 is fixedly disposed in the V groove 34 by the ceramic substrate 32 and the cover 42. The end face 46 of the second optical waveguide chip 30 is polished to an optical finish such that it lies at 90° with respect to the direction in which light 96 is propagated through the optical fiber 36. The laser diode module 70 is attached to the end face 46. The V grooves 14, 34 may be replaced with U grooves each having a U-shaped cross section.

The first optical waveguide chip 10 has an end face 24 polished to an optical finish such that it is inclined at θ=62° with respect to the direction in which light 90 is propagated through the optical fiber 16. The second optical waveguide chip 30 has an end face 44 polished to an optical finish such that it is inclined at θ=62° with respect to the direction in which light 96 is propagated through the optical fiber 36. Guide pins 50 are intimately inserted in the guide grooves 20, 40, thereby positioning the first optical waveguide chip 10 and the second optical waveguide chip 30 relatively to each other.

The end faces 24, 44 of the first and second optical waveguide chips 10, 30 extend substantially parallel to each other with an air layer 60 interposed therebetween, the air layer 60 having a thickness of about 5 μm. With such an arrangement, the optical fibers 16, 36 are optically coupled to each other, and a portion of light propagated from the optical fiber 16 to the optical fiber 36 is reflected into the photodiode 82 by the end faces 24, 44.

A method of fabricating the optical reception/transmission module according to a first embodiment of the present invention will be described below.

As shown in FIGS. 2 and 3, a ceramic substrate 12 having a length of 5 mm, a width of 5 mm, and a thickness of 3 mm is prepared, and a V groove 14 having a V-shaped cross section is defined centrally in the ceramic substrate 12 for accommodating a single-mode optical fiber 16 which has a diameter of 125 μm, and two guide grooves 20 are defined in the ceramic substrate 12 one on each side of the V groove 14 for accommodating respective rod-shaped guide pins 50 each having a diameter of 700 μm.

Then, an end portion of the optical fiber 16, which is 125 μm across and 2 m long, is placed in the V groove 14, with the optical connector 18 connected to the other end of the optical fiber 16.

Thereafter, a cover 22 of quartz having a thickness of 0.3 mm is placed on the ceramic substrate 12 over the optical fiber 16, and the ceramic substrate 12, the optical fiber 16, and the cover 22 are joined to each other by a resin adhesive.

The ceramic substrate 12, the optical fiber 16, and the cover 22 which are thus bonded jointly have an end face 24 cut and polished to an optical finish such that the end face 24 is inclined at θ=62° with respect to the direction in which light 90 is propagated through the optical fiber 16. In this manner, the first optical waveguide chip 10 is produced.

A ceramic substrate 32 having a length of 5 mm, a width of 5 mm, and a thickness of 3 mm is prepared, and a V groove 34 having a V-shaped cross section is defined centrally in the ceramic substrate 32 for accommodating a single-mode optical fiber 36 which has a diameter of 125 μm, and two guide grooves 40 are defined in the ceramic substrate 32 one on each side of the V groove 34 for accommodating the respective rod-shaped guide pins 50.

Then, the optical fiber 36, which is 125 μm across and 5 mm long, is placed in the V groove 34.

Thereafter, a cover 42 having a thickness of 0.3 mm is placed on the ceramic substrate 32 over the optical fiber 36, and the ceramic substrate 32, the optical fiber 36, and the cover 42 are joined to each other by a resin adhesive.

The ceramic substrate 32, the optical fiber 36, and the cover 42 which are thus bonded jointly have an end face 44 cut and polished to an optical finish such that the end face 44 is inclined at θ=62° with respect to the direction in which light 96 is propagated through the optical fiber 36. In this manner, the second optical waveguide chip 30 is produced.

Thereafter, a photodiode 82 is disposed above the first optical waveguide chip 10. Specifically, a photodiode module 80 is directly placed on and fixed to the upper surface of the cover 22, and the photodiode 82 in the photodiode module 80 is spaced 0.2 mm from the cover 22.

A laser diode module 70 which has a laser diode 72 and a lens 74 is attached to the end face 46 of the second optical waveguide chip 30 such that a laser beam 71 emitted from the laser diode 72 will be converged onto the optical fiber 36.

Guide pins 50 are inserted into the guide grooves 20 of the first optical waveguide chip 10 and the guide grooves 40 of the second optical waveguide chip 30 for aligning the optical axes of the optical fibers 16, 36 with each other. The end face 24 of the first optical waveguide chip 10 and the end face 44 of the second optical waveguide chip 30 are positioned parallel to each other such that the air layer 60 between the end faces 24, 44 has a thickness of about 5 μm. Then, a molten resin material is introduced into the guide grooves 20, 40, thereby integrally joining the first optical waveguide chip 10, the second optical waveguide chip 30, and the guide pins 50. In this manner, the component assembly 210 is produced.

Then, as shown in FIG. 4, the component assembly 210 is housed in a package 250, thereby completing the optical reception/transmission module 200. Leads 76 attached to the package 250 are electrically connected to the laser diode 72, and leads 86 attached to the package 250 are electrically connected to the photodiode 82. The leads 86 are connected to leads 84 (see FIG. 3).

The optical reception/transmission module 200 was measured for its characteristics. The light which was transmitted from the optical fiber 16 to the optical fiber 36 was about 60% of the light propagated through the optical fiber 16, and the light reflected as light 92, 94 by the end faces 24, 44 and having reached the photodiode 82 was about 5% of the light propagated through the optical fiber 16.

Figure 5:
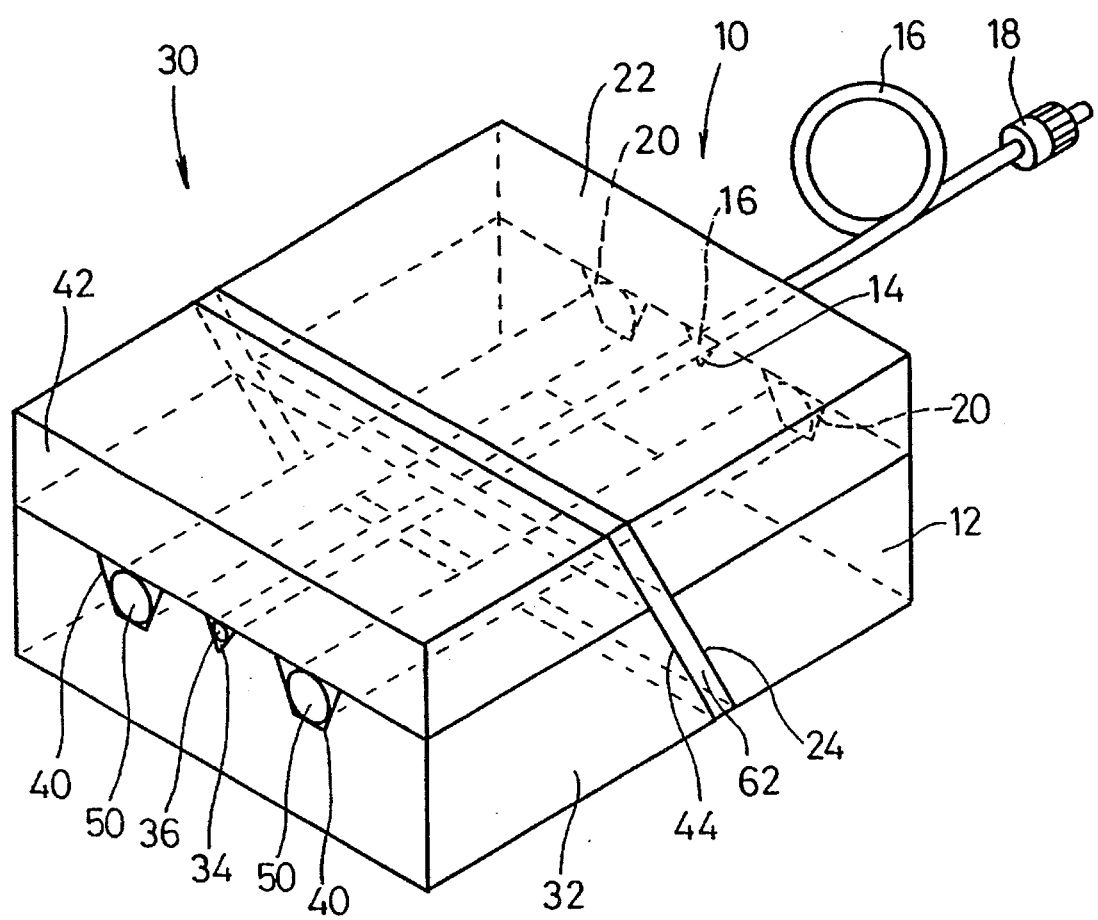
FIG. 5 is a perspective view illustrating a method of fabricating an optical component according to a second embodiment of the present invention.
Figure 6:
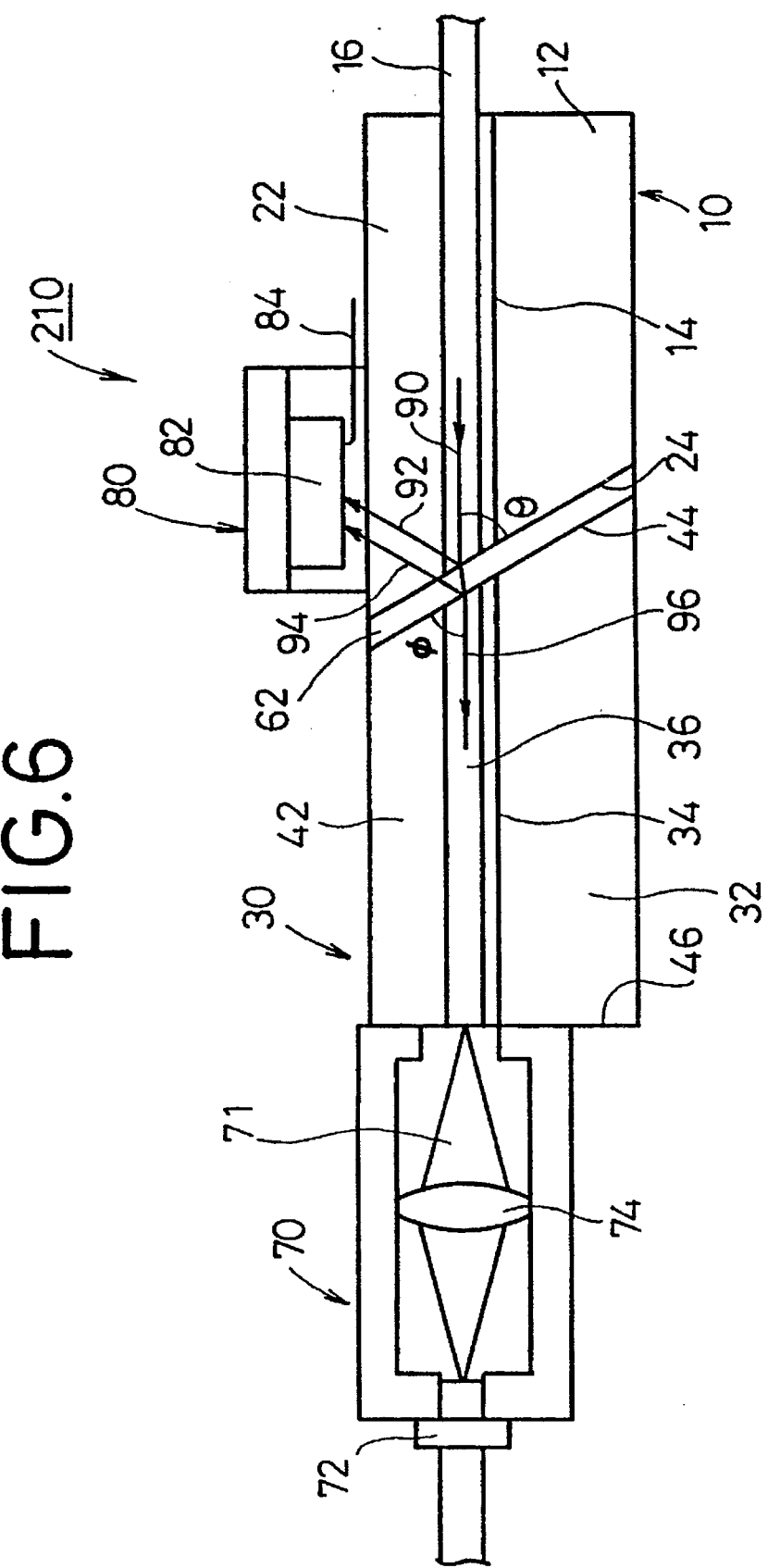
FIG. 6 is a cross-sectional view illustrating the method of fabricating an optical component according to the second embodiment of the present invention.

FIGS. 5 and 6 illustrate a method of fabricating an optical component according to a second embodiment of the present invention.

An optical reception/transmission module 200 fabricated according to the second embodiment of the present invention differs from the optical reception/transmission module 200 fabricated according to the first embodiment in that a titanium (Ti) film 62 is disposed on the end face 44 of the second optical waveguide chip 30 and held in contact with the end face 24 of the first optical waveguide chip 10. The other structural details of the optical reception/transmission module 200 shown in FIGS. 5 and 6 are the same as those of the optical reception/transmission module 200 shown in FIGS. 2 and 3.

The method of fabricating an optical component according to the second embodiment of the present invention will be described below.

As shown in FIGS. 5 and 6, a ceramic substrate 12 having a length of 5 mm, a width of 5 mm, and a thickness of 3 mm is prepared, and a V groove 14 having a V-shaped cross section is defined centrally in the ceramic substrate 12 for accommodating a single-mode optical fiber 16 which has a diameter of 125 μm, and two guide grooves 20 are defined in the ceramic substrate 12 one on each side of the V groove 14 for accommodating respective rod-shaped guide pins 50 each having a diameter of 700 μm.

Then, an end portion of the optical fiber 16, which is 125 μm across and 2 m long, is placed in the V groove 14, with the optical connector 18 connected to the other end of the optical fiber 16.

Thereafter, a cover 22 having a thickness of 0.3 mm is placed on the ceramic substrate 12 over the optical fiber 16, and the ceramic substrate 12, the optical fiber 16, and the cover 22 are joined to each other by a resin adhesive.

The ceramic substrate 12, the optical fiber 16, and the cover 22 which are thus bonded jointly have an end face 24 cut and polished to an optical finish such that the end face 24 is inclined at θ=62° with respect to the direction in which light 90 is propagated through the optical fiber 16. In this manner, the first optical waveguide chip 10 is produced.

A ceramic substrate 32 having a length of 5 mm, a width of 5 mm, and a thickness of 3 mm is prepared, and a V groove 34 having a V-shaped cross section is defined centrally in the ceramic substrate 32 for accommodating a single-mode optical fiber 36 which has a diameter of 125 µm, and two guide grooves 40 are defined in the ceramic substrate 32 one on each side of the V groove 34 for accommodating the respective rod-shaped guide pins 50.

Then, the optical fiber 36, which is 125 µm across and 5 mm long, is placed in the V groove 34.

Thereafter, a cover 42 having a thickness of 0.3 mm is placed on the ceramic substrate 32 over the optical fiber 36, and the ceramic substrate 32, the optical fiber 36, and the cover 42 are joined to each other by a resin adhesive.

The ceramic substrate 32, the optical fiber 36, and the cover 42 which are thus bonded jointly have an end face 44 cut and polished to an optical finish such that the end face 44 is inclined at θ=62° with respect to the direction in which light 96 is propagated through the optical fiber 36. Thereafter, a Ti film 62 having a thickness of 300 Å is disposed on the inclined end face 44. An opposite end face 46 is polished to an optical finish such that it lies at 90° with respect to the direction in which the light 96 is propagated through the optical fiber 36. In this manner, the second optical waveguide chip 30 is produced.

Thereafter, a photodiode 82 is disposed above the first optical waveguide chip 10. Specifically, a photodiode module 80 is directly placed on and fixed to the upper surface of the cover 22, and the photodiode 82 in the photodiode module 80 is spaced 0.2 mm from the cover 22.

A laser diode module 70 which has a laser diode 72 and a lens 74 is attached to the end face 46 of the second optical waveguide chip 30 such that a laser beam 71 emitted from the laser diode 72 will be converged onto the optical fiber 36.

Guide pins 50 are inserted into the guide grooves 20 of the first optical waveguide chip 10 and the guide grooves 40 of the second optical waveguide chip 30 for aligning the optical axes of the optical fibers 16, 36 with each other. The end face 24 of the first optical waveguide chip 10 and the Ti film 62 on the end face 44 of the second optical waveguide chip 30 are held in abutment against each other. Then, a molten resin material is introduced into the guide grooves 20, 40, thereby integrally joining the first optical waveguide chip 10, the second optical waveguide chip 30, and the guide pins 50. In this manner, the component assembly 210 is produced.

Then, as shown in FIG. 4, the component assembly 210 is housed in a package 250, thereby completing the optical reception/transmission module 200. Leads 76 attached to the package 250 are electrically connected to the laser diode 72, and leads 86 attached to the package 250 are electrically connected to the photodiode 82. The leads 86 are connected to leads 84 (see FIG. 3).

The optical reception/transmission module 200 shown in FIGS. 5 and 6 was measured for its characteristics. The light which was transmitted from the optical fiber 16 to the optical fiber 36 was about 50% of the light propagated through the optical fiber 16, and the light reflected as light 92, 94 by the end faces 24, 44 and having reached the photodiode 82 was about 10% of the light propagated through the optical fiber 16.

In the optical reception/transmission module 200 shown in FIGS. 5 and 6, the end faces 24, 44 are positioned in sandwiching relation to the Ti film 62 and held in contract with the Ti film 62. Therefore, any irregularities of the distance between the end faces 24, 44 are minimized, and hence characteristic variations of the optical reception/transmission module 200 are also minimized.

FIG. 7 illustrates a method of fabricating an optical component according to a third embodiment of the present invention.

As shown in FIG. 7, an optical reception/transmission module 300 comprises a first optical waveguide chip 110, a second optical waveguide chip 130, a photodiode array 180 mounted on the first optical waveguide chip 110, a laser diode array 172 spaced from the second optical waveguide chip 30, and a lens array 174 disposed between the laser diode array 172 and the second optical waveguide chip 130.

The laser diode array 172 comprises four laser diodes 171, and the lens array 174 comprises four lenses 173. Laser beams 175 emitted from the four laser diodes 171 are converged onto four single-mode optical fibers 136, respectively, by the four lenses 173. The photodiode array 180 comprises four photodiodes (not shown), and eight leads 184 extend from the photodiode array 180.

The first optical waveguide chip 110 has a substrate 112 of LiNbO₃. Four Ti-diffused optical waveguides 117 are formed at a pitch or spacing of 5 mm on an upper surface of the substrate 112 of LiNbO₃. The substrate 112 of LiNbO₃ has an end face 126 polished to an optical finish such that it lies at 90° with respect to the direction in which light is propagated through the Ti-diffused optical waveguides 117. An optical fiber array 116 is composed of four optical fibers 115 whose respective ends are aligned with and secured to the Ti-diffused optical waveguides 117, respectively. Optical connectors (not shown) are connected respectively to the other end of the optical fiber array 116. The photodiode array 180 is fixedly mounted on an upper surface of the substrate 112 of LiNbO₃.

The substrate 112 may be made of LiTaO₃, glass, or a semiconductor.

The second optical waveguide chip 130 has a ceramic substrate 132, a cover 142, and four optical fibers 136. The ceramic substrate 132 has V grooves 134 each having a V-shaped cross section for placing the respective optical fibers 136 therein, the V grooves 134 being defined in an upper surface of the ceramic substrate 132. The optical fibers 136 are disposed in the respective V grooves 134, and held in position by the ceramic substrate 142 and the cover 142. The second optical waveguide chip 130 has an end face 146 polished to an optical finish such that it lies at 90° with respect to the direction in which light is propagated through the optical fibers 136.

The first optical waveguide chip 110 has an end face 124 polished to an optical finish such that it is inclined at 62° to the direction in which light is propagated through the Ti-diffused optical waveguides 117. The second optical waveguide chip 130 has an end face 144 polished to an optical finish such that it is inclined at 62° to the direction in which light is propagated through the optical fibers 136.

The end face 124 of the first optical waveguide chip 110 and the end face 144 of the second optical waveguide chip 130 are held in direct contact with each other. With such an arrangement, the Ti-diffused optical waveguides 117 and the optical fibers 136 are directly held against, and optically coupled to, each other, and a portion of light propagated from the Ti-diffused optical waveguides 117 to the optical fibers 136 is reflected into the photodiodes of the photodiode array 180 by the end faces 124, 144.

The method of fabricating an optical component according to the third embodiment of the present invention will be described below.

Four Ti films (not shown) each having a width of 8 µm and a thickness of 300 Å are formed at a pitch or spacing of 5 mm on an upper surface of a substrate 112 of LiNbO₃ having a thickness of 1 mm. Thereafter, the Ti films are kept at a temperature of about 1000° C. for 6 hours, thereby producing four Ti-diffused optical waveguides 117 at a pitch or spacing of 5 mm.

Then, an end face 126 of the substrate 112 of LiNbO₃ is polished to an optical finish such that it lies at 90° with respect to the direction in which light is propagated through the Ti-diffused optical waveguides 117 (with respect to the upper surface of the substrate 112 of LiNbO₃ in this embodiment), and an end face 124 of the substrate 112 of LiNbO₃ is polished to an optical finish such that it is inclined at 62° to the direction in which light is propagated through the Ti-diffused optical waveguides 117 (to the upper surface of the substrate 112 of LiNbO₃ in this embodiment). In this manner, the first optical waveguide chip 110 is produced.

Then, a photodiode array 180 is placed on and fixed to the upper surface of the substrate 112 of LiNbO₃.

An optical fiber array 116 composed of four optical fibers 115 and having an end connected to optical connectors (not shown) is prepared. The other end of the optical fiber array 116 is optically adjusted and fixed to the end face 126 of the substrate 112 of LiNbO₃.

A ceramic substrate 132 having a length of 5 mm, a width of 5 mm, and a thickness of 3 mm is prepared, and four V grooves 134 each having a V-shaped cross section are defined centrally in the ceramic substrate 132 for accommodating four single-mode optical fibers 136 each having a diameter of 125 μm.

Then, the four optical fibers 136, which are 125 μm across and 5 mm long, are placed respectively in the V grooves 134.

Thereafter, a cover 142 having a thickness of 0.3 mm is placed on the ceramic substrate 132 over the optical fibers 136, and the ceramic substrate 132, the optical fibers 136, and the cover 142 are joined to each other by a resin adhesive.

The ceramic substrate 132, the optical fibers 136, and the cover 142 which are thus bonded jointly have an end face 144 cut and polished to an optical finish such that the end face 144 is inclined at 62° with respect to the direction in which light is propagated through the optical fibers 136. An opposite end 146 thereof is polished to an optical finish such that it lies at 90° with respect to the direction in which light is propagated through the optical fibers 136. In this manner, the second optical waveguide chip 130 is produced.

A laser diode array 172 and a lens array 174 are positioned on the side of the end face 146 such that four laser beams 175 emitted from the respective laser diodes 171 will be converged onto the respective optical fibers 136 by the respective lenses 173.

The laser diodes 171 are energized to emit laser beams. While the intensities of the emitted laser beams are being measured by the photodiode array 180, the optical axes of the optical fibers 136 and the Ti-diffused optical waveguides 117 are adjusted into alignment, and thereafter the first optical waveguide chip 110 and the second optical waveguide chip 130 are fixed to each other. In this manner, the optical reception/transmission module 300 is produced.

Then, as shown in FIG. 4, the optical reception/transmission module 300 is housed in a package 250, thereby completing the optical reception/transmission module 200. Leads 76 attached to the package 250 are electrically connected to the laser diode array 172, and leads 86 attached to the package 250 are electrically connected to the photodiode array 180. The leads 86 are connected to the leads 184 (see FIG. 7).

FIG. 8 illustrates the methods of fabricating an optical component according to the first and second embodiments of the present invention. In the first and second embodiments described above, the first optical waveguide chip 10 is composed of the ceramic substrate 12, the cover 22, and the optical fiber 16 with the optical connector 18 mounted on one end thereof, the optical fiber 16 having a length of 2 m, longer than the ceramic substrate 12 and the cover 22, and the second optical waveguide chip 30 is composed of the ceramic substrate 32, the cover 42, and the optical fiber 36 whose opposite ends terminate at the end faces 44, 46. The end face 24 of the first optical waveguide chip 10 is inclined to the direction of propagation of light through the optical fiber 16, and the end face 44 of the second optical waveguide chip 30 is inclined to the direction of propagation of light through the optical fiber 36. The end faces 24, 44 extend substantially parallel to each other with the air layer 60 or the Ti film 62 interposed therebetween. The photodiode module 80 is mounted on the upper surface of the cover 22 of the first optical waveguide chip 10, and the laser diode module 70 is mounted on the end face 46 of the second optical waveguide chip 30.

FIG. 9 illustrates a method of fabricating an optical component according to a fourth embodiment of the present invention. In the first and second embodiments, the photodiode module 80 is mounted on the upper surface of the cover 22 of the first optical waveguide chip 10, and the laser diode module 70 is mounted on the end face 46 of the second optical waveguide chip 30. According to the fourth embodiment, no photodiode module 80 is mounted on the upper surface of the cover 22 of the first optical waveguide chip 10, and no laser diode module 70 is mounted on the end face 46 of the second optical waveguide chip 30. In the first and second embodiments, the second optical waveguide chip 30 is composed of the ceramic substrate 32, the cover 42, and the optical fiber 36 whose opposite ends terminate at the end faces 44, 46. According to the fourth embodiment, a second optical waveguide chip 30 is composed of a ceramic substrate 32, a cover 42, and an optical fiber 36 having one end terminating at an end face 44 and an opposite end projecting from an end face 46. The other details of the fourth embodiment are the same as those of the first and second embodiments.

FIG. 10 illustrates a method of fabricating an optical component according to a fifth embodiment of the present invention. In the fourth embodiment shown in FIG. 9, no photodiode module 80 is mounted on the upper surface of the cover 22 of the first optical waveguide chip 10. According to the fifth embodiment, however, a photodiode module 80 is mounted on an upper surface of a cover 22 of a first optical waveguide chip 10. The other details of the fifth embodiment are the same as those of the fourth embodiment.

FIG. 11 illustrates a method of fabricating an optical component according to a sixth embodiment of the present invention. In the fifth embodiment shown in FIG. 10, no laser diode module 70 is employed. According to the sixth embodiment, however, a laser diode module 70 is mounted on an end of an optical fiber 36 which projects from an end face 46. The other details of the fifth embodiment are the same as those of the fourth embodiment.

Figure 12:
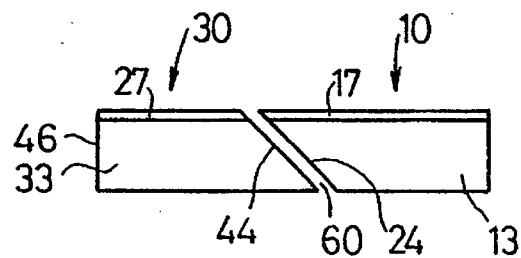
FIG. 12 is a cross-sectional view illustrating a method of fabricating an optical component according to a seventh embodiment of the present invention.

FIG. 12 illustrates a method of fabricating an optical component according to a seventh embodiment of the present invention. In the first and second embodiments described above, the first optical waveguide chip 10 is composed of the ceramic substrate 12, the cover 22, and the optical fiber 16, and the second optical waveguide chip 30 is composed of the ceramic substrate 32, the cover 42, and the optical fiber 36. The end face 24 of the first optical waveguide chip 10 is inclined to the direction of propagation of light through the optical fiber 16, and the end face 44 of the second optical waveguide chip 30 is inclined to the direction of propagation of light through the optical fiber 36. The end faces 24, 44 extend substantially parallel to each other with the air layer 60 or the Ti film 62 interposed therebetween.

According to the seventh embodiment, however, a first optical waveguide chip 10 comprises a substrate 13 of LiNbO$_3$ and a Ti-diffused optical waveguide 17 disposed on an upper surface thereof, and a second optical waveguide chip 30 comprises a substrate 33 of LiNbO$_3$ and a Ti-diffused optical waveguide 27 disposed on an upper surface thereof. An end face 24 of the first optical waveguide chip 10 is inclined to the direction of propagation of light through the Ti-diffused optical waveguide 17, and an end face 44 of the second optical waveguide chip 30 is inclined to the direction of propagation of light through the Ti-diffused optical waveguide 27. The end faces 24, 44 extend substantially parallel to each other with an air layer 60 interposed therebetween. In the first and second embodiments, the photodiode module 80 is mounted on the upper surface of the cover 22 of the first optical waveguide chip 10, and the laser diode module 70 is mounted on the end face 46 of the second optical waveguide chip 30. According to the seventh embodiment, however, no photodiode module 80 is mounted on the first optical waveguide chip 10, and no laser diode module 70 is mounted on the end face 46 of the second optical waveguide chip 30. The other details of the seventh embodiment are the same as those of the first and second embodiments.

Figure 13:
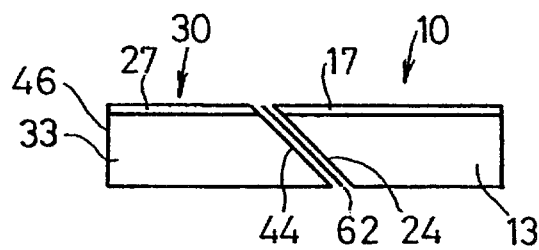
FIG. 13 is a cross-sectional view illustrating a method of fabricating an optical component according to an eighth embodiment of the present invention.

FIG. 13 illustrates a method of fabricating an optical component according to an eighth embodiment of the present invention. In the seventh embodiment shown in FIG. 12, the end faces 24, 44 extend substantially parallel to each other with an air layer 60 interposed therebetween. According to the eighth embodiment, end faces 24, 44 extend substantially parallel to each other with a Ti film 62 interposed therebetween. The other details of the eighth embodiment are the same as those of the seventh embodiment.

Figure 14:
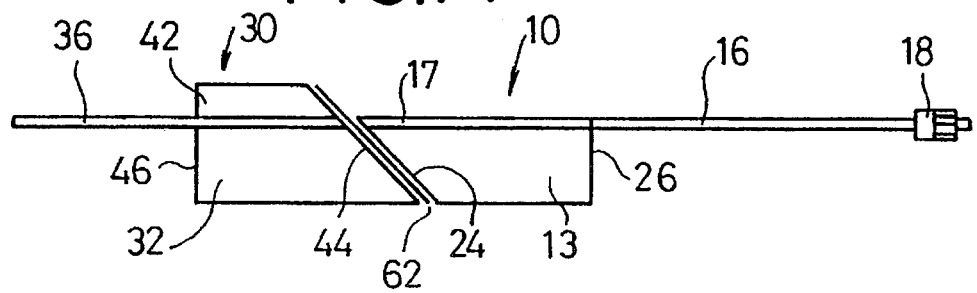
FIG. 14 is a cross-sectional view illustrating a method of fabricating an optical component according to a ninth embodiment of the present invention.

FIG. 14 illustrates a method of fabricating an optical component according to a ninth embodiment of the present invention. In the third embodiment shown in FIG. 7, the end face 124 of the first optical waveguide chip 110 and the end face 144 of the second optical waveguide chip 130 are held in direct contact with each other, so that the Ti-diffused optical waveguides 117 and the optical fibers 136 are held in direct contact with each other and optically coupled to each other, and a portion of light propagated from the Ti-diffused optical waveguides 117 to the optical fibers 136 is reflected by the end faces 124, 144. According to the ninth embodiment, end faces 24, 44 extend substantially parallel to each other with a Ti film 62 interposed therebetween, so that a Ti-diffused optical waveguide 17 and an optical fiber 36 are optically coupled to each other, and a portion of light propagated from the Ti-diffused optical waveguide 17 to the optical fiber 36 is reflected by the end faces 24, 44. In the third embodiment shown in FIG. 7, the photodiode array 180 is mounted on the upper surface of the substrate 112 of LiNbO$_3$, and the laser diode array 172 and the lens array 174 are mounted on the end face 146 of the second optical waveguide chip 130. According to the ninth embodiment, however, no photodiode array 180 is mounted on the upper surface of a substrate 13 of LiNbO$_3$, and no laser diode array 172 and no lens array 174 are mounted on an end face 46 of the second optical waveguide chip 30. In the third embodiment shown in FIG. 7, the second optical waveguide chip 130 is composed of the ceramic substrate 132, the cover 142, and optical fibers 136 whose opposite ends terminate at the end faces 144, 146. According to the ninth embodiment, the second optical waveguide chip 30 is composed of a ceramic substrate 32, a cover 42, and an optical fiber 36 having one end terminating at the end face 44 and an opposite end projecting from the end face 46. The other details of the ninth embodiment are the same as those of the third embodiment.

Figure 15:
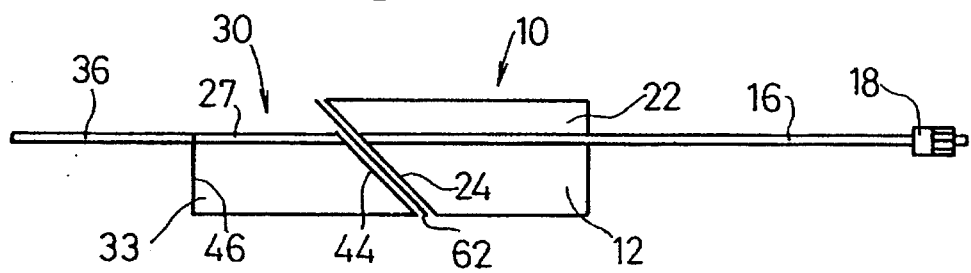
FIG. 15 is a cross-sectional view illustrating a method of fabricating an optical component according to a tenth embodiment of the present invention.

FIG. 15 illustrates a method of fabricating an optical component according to a tenth embodiment of the present invention. In the ninth embodiment shown in FIG. 14, the first optical waveguide chip 10 is composed of the substrate 13 of LiNbO$_3$ and the Ti-diffused optical waveguide 17 disposed on the upper surface thereof, and the optical fiber 16 is coupled to the Ti-diffused optical waveguide 17 at the end face 26. According to the tenth embodiment, a first optical waveguide chip 10 comprises a ceramic substrate 12, a cover 22, and an optical fiber 16. In the ninth embodiment shown in FIG. 14, the second optical waveguide chip 30 is composed of the ceramic substrate 32, the cover 42, and the optical fiber 36. According to the tenth embodiment, a second optical waveguide chip 30 comprises a substrate 33 of LiNbO$_3$ and a Ti-diffused optical waveguide 27 disposed on the upper surface thereof, and an optical fiber 36 is coupled to the Ti-diffused optical waveguide 27 at an end face 46.

The present invention offers the following advantages:

(1) The first optical waveguide chip having the first optical waveguide is formed and polished to an optical finish such that an end face of the first optical waveguide chip where an end of the first optical waveguide is exposed is inclined to the direction of propagation of light through the first optical waveguide, and the second optical waveguide chip having the second optical waveguide and different from the first optical waveguide chip is formed and polished to an optical finish such that an end face of the second optical waveguide chip where an end of the second optical waveguide is exposed is inclined to the direction of propagation of light through the second optical waveguide. The first and second optical waveguides are positioned relatively to each other such that the inclined end faces extend substantially parallel to each other with a layer interposed therebetween which has a refractive index that is different from the refractive index of at least one of the first and second optical waveguides. A portion of light propagated from the first optical waveguide to the second optical waveguide is reflected out of at least one of the first and second optical waveguide chips by at least one of the inclined end faces of the first and second optical waveguide chips. An optical component thus constructed has a length smaller than a conventional optical component which is composed of two optical fibers fused to each other.

(2) The first optical waveguide chip having the first optical waveguide is formed and polished to an optical finish such that an end face of the first optical waveguide where an end of the first optical waveguide chip is exposed is inclined to the direction of propagation of light through the first optical waveguide, and the second optical waveguide chip having the second optical waveguide whose refractive index differs from that of the first optical waveguide and different from the first optical waveguide chip is formed and polished to an optical finish such that an end face of the second optical waveguide chip where an end of the second optical waveguide is exposed is inclined to the direction of propagation of light through the second optical waveguide. The first and second optical waveguides are positioned relatively to each other such that the inclined end faces extend substantially parallel to each other and the exposed ends of the first and second optical waveguides are held in direct contact with each other and optically coupled to each other. A portion of light propagated from the first optical waveguide to the second optical waveguide is reflected out of at least one of the first and second optical waveguide chips by at least one of the inclined end faces of the first and second optical waveguide chips. An optical component thus constructed has a length smaller than a conventional optical component which is composed of two optical fibers fused to each other.

(3) According to the present invention, the first optical waveguide is disposed in the first optical waveguide chip, and the second optical waveguide chip is disposed in the second optical waveguide chip, and the first and second optical waveguides are optically coupled to each other and light is emitted from the first optical waveguide chip and/or the second optical waveguide chip by the inclined end faces of the first and second optical waveguide chips. If a plurality of light paths are required, then a plurality of first optical waveguides may be disposed in the first optical waveguide chip, and a plurality of second optical waveguides may be disposed in the second optical waveguide chip. As a result, the optical component may easily be fabricated in an integrated configuration, and reduced in size and cost.

(4) In the case where the second optical waveguide whose refractive index differs from that of the first optical waveguide is disposed in the second optical waveguide chip, even though the first and second optical waveguides are positioned relatively to each other such that the exposed ends of the first and second optical waveguides are held in direct contact with each other and optically coupled to each other, a portion of light propagated from the first optical waveguide to the second optical waveguide is reflected out of at least one of the first and second optical waveguide chips. Consequently, the first and second optical waveguide chips can easily be positioned relatively to each other.

(5) At least one or both of the step of forming the first optical waveguide chip having the first optical waveguide and the step of forming the second optical waveguide chip having the second optical waveguide may comprise the steps of placing an optical fiber in a V groove of a V-shaped cross section or a U groove of a U-shaped cross section which is defined in the substrate and fixing the optical fiber in the V or U groove with the substrate and the cover. With such a process, the first optical waveguide and/or the second optical waveguide becomes an optical fiber. Since this optical fiber is of the same material as the optical fiber used for transmission, these optical fibers can easily be spliced to each other with a small optical loss.

(6) If the first optical waveguide and/or the second optical waveguide is formed by a process including the steps of placing an optical fiber in a V groove of a V-shaped cross section or a U groove of a U-shaped cross section which is defined in the substrate and fixing the optical fiber in the V or U groove with the substrate and the cover, then the optical fiber is positioned accurately in the optical waveguide chip. Even though the first optical waveguide and/or the second optical waveguide is an optical fiber, since the cover is disposed over the optical fiber, a light-detecting element for detecting light emitted out of the first optical waveguide and/or the second optical waveguide may be disposed on the cover. Therefore, the light-detecting element may be installed with ease.

(7) At least one or both of the step of forming the first optical waveguide chip having the first optical waveguide and the step of forming the second optical waveguide chip having the second optical waveguide may comprise the step of diffusing an impurity in a dielectric substrate to form an optical waveguide in the dielectric substrate. With such a process, a number of optical waveguides may easily be formed in a substrate, and may easily be fabricated in an integrated configuration. Where the first optical waveguide and/or the second optical waveguide is in the form of an optical waveguide formed by diffusing an impurity in the dielectric substrate, a light-detecting element or the like may easily be placed on the dielectric substrate even without placing a cover on the dielectric substrate.

(8) In the case where the inclined end faces extend substantially parallel to each other with a layer interposed therebetween which has a refractive index that is different from the refractive index of at least one of the first and second optical waveguides, the layer may comprise a dielectric or metal layer interposed between the inclined end faces, and the exposed ends of the first and second optical waveguides may be held in direct contact with one and other surfaces of the dielectric or metal layer. With this arrangement, the distance between the exposed ends of the first and second optical waveguides is determined highly accurately, and hence it is possible to determine with accuracy an intensity of light which is transmitted from the first optical waveguide to the second optical waveguide and an intensity of light which is emitted out of at least one of the first and second optical waveguide chips.

Since the dielectric or metal layer is interposed between the exposed ends of the first and second optical waveguides, the intensity of light which is transmitted from the first optical waveguide to the second optical waveguide and the intensity of light which is emitted out of at least one of the first and second optical waveguide chips can easily be controlled by selecting a material of the dielectric or metal layer.

(9) In the case where the step of positioning the first and second optical waveguide chips comprises the steps of defining the first and second guide grooves in the first and second optical waveguide chips and positioning the first and second optical waveguide chips with reference to pins intimately held in the first and second guide grooves, the first and second optical waveguide chips can easily be positioned relatively to each other.

(10) In the case where the step of forming the first optical waveguide chip having the first optical waveguide comprises the step of forming the first optical waveguide chip having a plurality of parallel optical waveguides, and the step of forming the second optical waveguide chip having the second optical waveguide comprises the step of forming the second optical waveguide chip having a plurality of parallel optical waveguides, a highly integrated optical component can be fabricated.

Although certain preferred embodiments of the present invention has been shown and described in detail, it should be understood that various changes and modifications may be made therein without departing from the scope of the appended claims.

What is claimed is:

1. A method of fabricating an optical component, comprising the steps of:

forming a first optical waveguide chip having a first optical waveguide;

forming a second optical waveguide chip having a second optical waveguide and different from said first optical waveguide chip;

processing said first optical waveguide chip to form a first end face thereof at which an end of said first optical waveguide is exposed;

polishing said first optical waveguide chip to an optical finish to incline a second end face thereof at which an opposite end of said first optical waveguide is exposed, to a direction in which light is propagated through said first optical waveguide;

processing said second optical waveguide chip to form a third end face thereof at which an end of said second optical waveguide is exposed;

polishing said second optical waveguide chip to an optical finish to incline a fourth end face thereof at which an opposite end of said second optical waveguide is exposed, to a direction in which light is propagated through said second optical waveguide; and positioning said first optical waveguide chip and said second optical waveguide chip relative to each other such that said second and fourth end faces extend substantially parallel to each other with a layer interposed therebetween which has a refractive index that is different from the refractive index of at least one of said first and second optical waveguides, said first and second optical waveguides being optically coupled to each other such that a portion of light propagated from said first optical waveguide to said second optical waveguide is reflected out of at least one of the first and second optical waveguide chips by at least one of said second end face of said first optical waveguide chip and said fourth end face of said second optical waveguide chip, the reflected light propagating through a light transmissive portion of at least one of said optical waveguide chips.

2. A method according to claim 1, wherein at least one of the step of forming a first optical waveguide chip having a first optical waveguide and the step of forming a second optical waveguide chip having a second optical waveguide comprises the steps of placing an optical fiber in a V groove of a V-shaped cross section or a U groove of a U-shaped cross section which is defined in a substrate and fixing the optical fiber in the V or U groove with the substrate and a cover.

3. A method according to claim 1, wherein both the step of forming a first optical waveguide chip having a first optical waveguide and the step of forming a second optical waveguide chip having a second optical waveguide comprise the steps of placing an optical fiber in a V groove of a V-shaped cross section or a U groove of a U-shaped cross section which is defined in a substrate and fixing the optical fiber in the V or U groove with the substrate and a cover.

4. A method according to claim 1, wherein at least one of the step of forming a first optical waveguide chip having a first optical waveguide and the step of forming a second optical waveguide chip having a second optical waveguide comprises the step of diffusing an impurity in a dielectric substrate to form the optical waveguide in said dielectric substrate.

5. A method according to claim 1, wherein both the step of forming a first optical waveguide chip having a first optical waveguide and the step of forming a second optical waveguide chip having a second optical waveguide comprise the step of diffusing an impurity in a dielectric substrate to form the optical waveguide in said dielectric substrate.

6. A method according to claim 5, wherein said step of diffusing an impurity in a dielectric substrate to form the optical waveguide in said dielectric substrate comprises the step of diffusing an impurity into a dielectric substrate made of $LiNbO_3$, $LiTaO_3$, glass, or a semiconductor to form the optical waveguide in said dielectric substrate.

7. A method according to claim 1, wherein said layer comprises one of a layer of air, a layer of dielectric, or a layer of metal.

8. A method according to claim 1, wherein said layer comprises one of a layer of dielectric or a layer of metal, and the ends of said first and second optical waveguides which are exposed at said second and fourth end faces are held in direct contact with opposite surfaces, respectively, of said layer and are optically coupled to each other.

9. A method according to claim 1, wherein one of the step of forming a first optical waveguide chip having a first optical waveguide and the step of forming a second optical waveguide chip having a second optical waveguide comprises the steps of placing an optical fiber in a V groove of a V-shaped cross section or a U groove of a U-shaped cross section which is defined in a substrate and fixing the optical fiber in the V or U groove with the substrate and a cover, and wherein the other of the step of forming a first optical waveguide chip having a first optical waveguide and the step of forming a second optical waveguide chip having a second optical waveguide comprises the step of diffusing an impurity in a dielectric substrate to form the optical waveguide in said dielectric substrate.

10. A method according to claim 1, wherein said step of positioning comprises the steps of defining first and second guide grooves in said first and second optical waveguide chips and positioning said first and second optical waveguide chips with reference to pins intimately held in said first and second guide grooves.

11. A method according to claim 1, wherein both of the step of forming a first optical waveguide chip having a first optical waveguide and the step of forming a second optical waveguide chip having a second optical waveguide comprise the steps of placing an optical fiber in a V groove of a V-shaped cross section or a U groove of a U-shaped cross section which is defined in a substrate and fixing the optical fiber in the V or U groove with the substrate and a cover, and wherein said step of positioning comprises the steps of defining first and second guide grooves in said first and second optical waveguide chips and positioning said first and second optical waveguide chips with reference to pins intimately held in said first and second guide grooves.

12. A method according to claim 1, wherein at least one of the step of forming a first optical waveguide chip having a first optical waveguide and the step of forming a second optical waveguide chip having a second optical waveguide comprises the steps of placing an optical fiber in a V groove of a V-shaped cross section or a U groove of a U-shaped cross section which is defined in a substrate and fixing the optical fiber in the V or U groove with the substrate and a cover made of a material which passes light propagated through said optical fiber, said method further comprising the step of fixing to said cover a light-detecting element for detecting the light which is reflected out of at least one of the first and second optical waveguide chips by at least one of said second end face and said fourth end face.

13. A method according to claim 1, further comprising the step of providing a light source for introducing light into said second optical waveguide.

14. A method according to claim 13, further comprising the step of providing an optical coupling means for optically coupling the light from said light source to the end of said second optical waveguide which is exposed at said third end face.

15. A method according to claim 1, wherein said step of forming a first optical waveguide chip having a first optical waveguide comprises the step of forming a first optical waveguide having a plurality of parallel optical waveguides, and said step of forming a second optical waveguide chip having a second optical waveguide comprises the step of forming a second optical waveguide having a plurality of parallel optical waveguides.

16. A method according to claims 1, further comprising the step of providing a light-detecting element for detecting the light which is reflected out of at least one of the first and second optical waveguide chips by at least one of said second end face and said fourth end face.

17. A method of fabricating an optical component, comprising the steps of:

forming a first optical waveguide chip having a first optical waveguide;

forming a second optical waveguide chip having a second optical waveguide which has a refractive index different from the refractive index of said first optical waveguide, and different from said first optical waveguide chip;

processing said first optical waveguide chip to form a first end face thereof at which an end of said first optical waveguide is exposed;

polishing said first optical waveguide chip to an optical finish to incline a second end face thereof at which an opposite end of said first optical waveguide is exposed, to a direction in which light is propagated through said first optical waveguide;

processing said second optical waveguide chip to form a third end face thereof at which an end of said second optical waveguide is exposed;

polishing said second optical waveguide chip to an optical finish to incline a fourth end face thereof at which an opposite end of said second optical waveguide is exposed, to a direction in which light is propagated through said second optical waveguide; and positioning said first optical waveguide chip and said second optical waveguide chip relative to each other such that said second and fourth end faces extend substantially parallel to each other, the ends of said first and second optical waveguides which are exposed at said second and fourth end faces being held in direct contact with each other and being optically coupled to each other such that a portion of light propagated from said first optical waveguide to said second optical waveguide is reflected out of at least one of the first and second optical waveguide chips by at least one of said second end face of said first optical waveguide chip and said fourth end face of said second optical waveguide chip, the reflected light propagating through a light transmissive portion of at least one of said optical waveguide chips.

18. A method according to claim 17, wherein at least one of the step of forming a first optical waveguide chip having a first optical waveguide and the step of forming a second optical waveguide chip having a second optical waveguide comprises the steps of placing an optical fiber in a V groove of a V-shaped cross section or a U groove of a U-shaped cross section which is defined in a substrate and fixing the optical fiber in the V or U groove with the substrate and a cover.

19. A method according to claim 17, wherein both of the step of forming a first optical waveguide chip having a first optical waveguide and the step of forming a second optical waveguide chip having a second optical waveguide comprise the steps of placing an optical fiber in a V groove of a V-shaped cross section or a U groove of a U-shaped cross section which is defined in a substrate and fixing the optical fiber in the V or U groove with the substrate and a cover.

20. A method according to claim 17, wherein at least one of the step of forming a first optical waveguide chip having a first optical waveguide and the step of forming a second optical waveguide chip having a second optical waveguide comprises the step of diffusing an impurity in a dielectric substrate to form the optical waveguide in said dielectric substrate.

21. A method according to claim 20, wherein said step of diffusing an impurity in a dielectric substrate to form the optical waveguide in said dielectric substrate comprises the step of diffusing an impurity into a dielectric substrate made of $LiNbO_3$, $LiTaO_3$, glass, or a semiconductor to form the optical waveguide in said dielectric substrate.

22. A method according to claim 17, wherein both of the step of forming a first optical waveguide chip having a first optical waveguide and the step of forming a second optical waveguide chip having a second optical waveguide comprise the step of diffusing an impurity in a dielectric substrate to form the optical waveguide in said dielectric substrate.

23. A method according to claim 17, wherein one of the step of forming a first optical waveguide chip having a first optical waveguide and the step of forming a second optical waveguide chip having a second optical waveguide comprises the steps of placing an optical fiber in a V groove of a V-shaped cross section or a U groove of a U-shaped cross section which is defined in a substrate and fixing the optical fiber in the V or U groove with the substrate and a cover, and wherein-the other of the step of forming a first optical waveguide chip having a first optical waveguide and the step of forming a second optical waveguide chip having a second optical waveguide comprises the step of diffusing an impurity in a dielectric substrate to form the optical waveguide in said dielectric substrate.

24. A method according to claim 17, wherein said step of positioning comprises the steps of defining first and second guide grooves in said first and second optical waveguide chips and positioning said first and second optical waveguide chips with reference to pins intimately held in said first and second guide grooves.

25. A method according to claim 17, wherein at least one of the step of forming a first optical waveguide chip having a first optical waveguide and the step of forming a second optical waveguide chip having a second optical waveguide comprises the steps of placing an optical fiber in a V groove of a V-shaped cross section or a U groove of a U-shaped cross section which is defined in a substrate and fixing the optical fiber in the V or U groove with the substrate and a cover made of a material which passes light propagated through said optical fiber, said method further comprising the step of fixing to said cover a light-detecting element for detecting the light which is reflected out of at least one of the first and second optical waveguide chips by at least one of said second end face and said fourth end face.

26. A method according to claim 17, further comprising the step of providing a light source for introducing light into said second optical waveguide.

27. A method according to claim 26, further comprising the step of providing an optical coupling means for optically coupling the light from said light source to the end of said second optical waveguide which is exposed at said third end face.

28. A method according to claim 17, wherein said step of forming a first optical waveguide chip having a first optical waveguide comprises the step of forming a first optical waveguide having a plurality of parallel optical waveguides, and said step of forming a second optical waveguide chip having a second optical waveguide comprises the step of forming a second optical waveguide having a plurality of parallel optical waveguides.

29. A method according to claim 17, further comprising the step of providing a light-detecting element for detecting the light which is reflected out of at least one of the first and second optical waveguide chips by at least one of said second end face and said fourth end face.

* * * * *